United States Patent
Kumar et al.

(10) Patent No.: US 9,363,183 B2
(45) Date of Patent: Jun. 7, 2016

(54) NETWORK ADDRESS TRANSLATION OFFLOAD TO NETWORK INFRASTRUCTURE FOR SERVICE CHAINS IN A NETWORK ENVIRONMENT

(71) Applicant: CISCO TECHNOLOGY, INC., San Jose, CA (US)

(72) Inventors: Surendra M. Kumar, San Ramon, CA (US); Paul Quinn, Wellesley, MA (US); James N. Guichard, New Boston, NH (US); Michael R. Smith, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 175 days.

(21) Appl. No.: 14/249,636

(22) Filed: Apr. 10, 2014

(65) Prior Publication Data

US 2015/0295831 A1    Oct. 15, 2015

(51) Int. Cl.
*H04L 12/803* (2013.01)
*H04L 29/12* (2006.01)
*H04L 12/851* (2013.01)
*H04L 12/54* (2013.01)
*H04L 12/28* (2006.01)

(52) U.S. Cl.
CPC .......... *H04L 47/125* (2013.01); *H04L 61/2514* (2013.01); *H04L 12/28* (2013.01); *H04L 12/56* (2013.01); *H04L 47/2483* (2013.01)

(58) Field of Classification Search
None
See application file for complete search history.

(56) References Cited

U.S. PATENT DOCUMENTS

| 7,305,492 B2 | 12/2007 | Bryers et al. |
| 7,653,745 B1 * | 1/2010 | Biswas ............. H04L 29/12283 370/230 |
| 7,738,469 B1 | 6/2010 | Shekokar et al. |
| 8,166,196 B2 | 4/2012 | Nidumolu et al. |
| 2005/0289244 A1 | 12/2005 | Sahu et al. |
| 2008/0177896 A1 | 7/2008 | Quinn et al. |
| 2012/0082073 A1 * | 4/2012 | Andreasen .......... H04L 12/4633 370/310 |
| 2015/0092551 A1 * | 4/2015 | Moisand ............. H04L 67/1027 370/235 |
| 2015/0281173 A1 | 10/2015 | Quinn et al. |

FOREIGN PATENT DOCUMENTS

| WO | WO 2013/063791 | 10/2013 |
| WO | WO 2015/117642 | * 2/2014 ............ H04L 12/801 |

* cited by examiner

*Primary Examiner* — Kodzovi Acolatse
(74) *Attorney, Agent, or Firm* — Patent Capital Group

(57) ABSTRACT

An example method for network address translation (NAT) offload to network infrastructure for service chains in a network environment is provided and includes receiving a packet at a network infrastructure in a network comprising a plurality of service nodes interconnected through the network infrastructure, each service node executing at least one service function, identifying the packet as belonging to a first flow based on a cookie in a network service header of the packet that indicates a service chain that includes a sequence of service functions to be executed on the packet at the service nodes, determining that a service function in the service chain is to be offloaded from one of the service nodes to the network infrastructure for subsequent packets of the first flow, and executing the offloaded service function at the network infrastructure for subsequent packets of the first flow.

20 Claims, 9 Drawing Sheets

NETWORK ADDRESS TRANSLATION OFFLOAD TO NETWORK INFRASTRUCTURE FOR SERVICE CHAINS IN A NETWORK ENVIRONMENT

TECHNICAL FIELD

This disclosure relates in general to the field of communications and, more particularly, to network address translation (NAT) offload to network infrastructure for service chains in a network environment.

BACKGROUND

Data centers are increasingly used by enterprises for effective collaboration, interaction, and storing data/resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for NAT offload to network infrastructure for service chains in a network environment is provided and includes receiving a packet at a network infrastructure in a network comprising a plurality of service nodes interconnected through the network infrastructure, each service node executing at least one service function, identifying the packet as belonging to a first flow based on a cookie in a network service header (NSH) of the packet that indicates a service chain, which includes a sequence of service functions to be executed on the packet at the service nodes, where a flow tuple of the packet indicates a different second flow, determining that a service function in the service chain is to be offloaded from one of the service nodes to the network infrastructure for subsequent packets of the first flow, and executing the offloaded service function at the network infrastructure for subsequent packets of the first flow.

As used herein, the term "network infrastructure" comprises hardware and software resources of a network that enable network connectivity, communication, operations, and management of the network. The network infrastructure provides communication paths between users, processes, applications, services, and external networks (e.g., the Internet). A typical network infrastructure includes networking hardware such as routers, switches, local area network (LAN) cards, wireless routers, cables, etc.; and networking software, such as network operations and management (e.g., control plane configurations), operating systems, etc. In some embodiments, the network infrastructure may comprise distributed virtual switches, which include software constructs providing switching/routing capabilities.

Example Embodiments

Figure 1A:
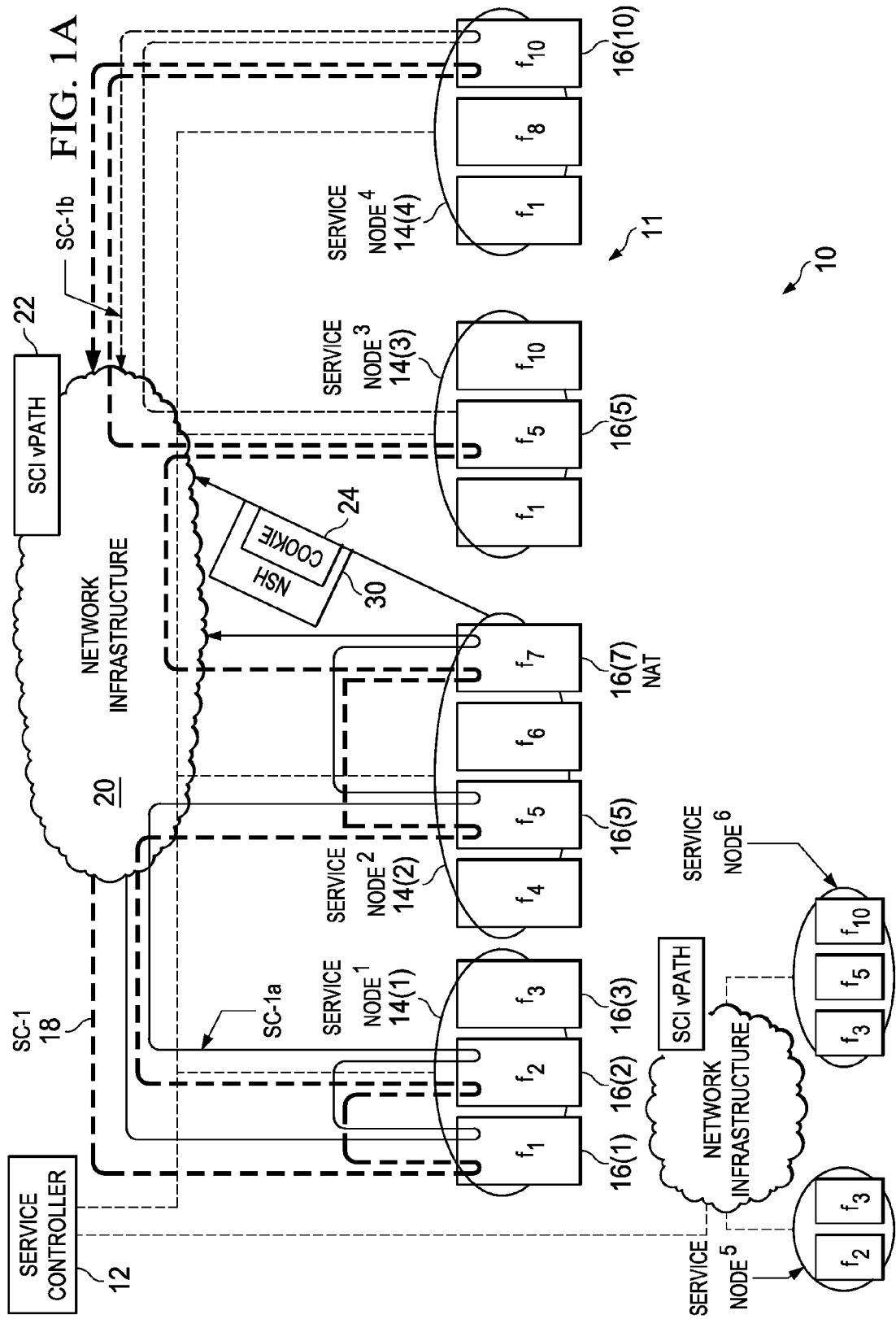
FIG. 1A is a simplified block diagram illustrating communication system for NAT offload to network infrastructure for service chains in a network environment according to an example embodiment.

Turning to FIGS. 1A-1D, FIGS. 1A-1D are simplified block diagrams illustrating a communication system 10 for service node originated service chains in a network environment in accordance with one example embodiment. FIG. 1A illustrates a network 11 comprising a service controller 12, and a plurality of service nodes 14(1)-14(4). A plurality of service functions 16(1)-16(10) may be instantiated on (and thereby associated with) service nodes 14(1)-14(4). For example, service functions 16(1)-16(3) may be instantiated on service node 14(1); service functions 16(4)-16(7) may be instantiated on service node 14(2); and so on.

Service controller 12 may specify that certain network traffic (e.g., data traversing the network, usually formatted into packets, a sequence of which comprise flows) to follow specific service chains according to various service characteristics (e.g., a specific tuple of fields in Ethernet, Internet Protocol (IP), Transmission Control Protocol (TCP), hypertext transfer protocol (HTTP) headers, etc.) or service policies (e.g., access ports, quality of service, etc.)). An example service chain 18 is illustrated in the figure as comprising service functions 16(1), 16(2) (at service node 14(1)); 16(5), 16(7) (at service node 14(2)); 16(5) (at service node 14(3)); and 16(10) (at service node 14(4)) in that specific order (f1→f2→f5→f7→f5→f10).

In some embodiments, flows (e.g., a flow is a sequence of packets from a source network node to a destination network node, and is identified by a unique flow tuple (e.g., source IP address, destination IP address, source port address, destination port address, protocol)) arriving in network 11 may be classified at a classifier using a locally instantiated policy and customer or network or service profile matching of flows to service chains for identification of appropriate outbound forwarding actions. Note that the flow identification can comprise a five tuple in its finest granularity or a subset of it in a coarser case. The classifier may create a service path (e.g., a path that flows are forwarded through in a service chain) comprising service nodes 14(1)-14(4) that together execute service functions 16(1)-16(10) comprising service chain 18 on packets belonging to the classified flow.

As used herein, the term "service function" refers to a logical entity (e.g., software code) executing in a network element that can provide one or more service functions such as firewall, Deep Packet Inspection (DPI), Lawful Intercept (LI), encapsulation/decapsulation, NAT, etc. for packets (or frames in Layer 2 of the Open Systems Interconnect (OSI) network model) traversing the network. Some service functions may be computation intensive. A "service chain" comprises a sequence of a plurality of service functions chained together in a specific order to provide a composite service to packets traversing the network. In a general sense, packets belonging to a specific flow are processed according to a specific service chain.

As used herein, the term "service node" comprises a physical or virtual network element that can be reached over the network using a unique address (e.g., Internet Protocol (IP) address) associated therewith, and that can provide one or more service functions to packets traversing the network. As used herein, the term "network element" is meant to encompass computers, network appliances, servers, routers, switches, gateways, bridges, load balancers, intrusion detection appliances, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. Each service node 14(1)-14(4) forwards packets to service functions 16(1)-16(10) associated with the respective service node in service chain 18. Service nodes 14(1)-14(4) can also provide mapping, insertion, and removal of header(s) in packets.

Network infrastructure 20 may provide traditional transport (e.g., routing and switching) capability for the service chains (e.g., service chain 18). Interconnections between service functions 16(1)-16(10) and their service nodes 14(1)-14(4), and between service nodes 14(1)-14(4) can be a physical or logical link or a network path, which may be an Ethernet, Internet Protocol (IP), Multiprotocol Label Switching (MPLS) or other suitable network protocol underlay network provided in network infrastructure 20. In some embodiments, for example, as illustrated in the figure, network infrastructure 20 may comprise a service chain intelligence (SCI) module comprising, for example, Cisco™ vPath [architecture] 22. Network infrastructure 20 may also provide an overlay transport mechanism, for example, for forwarding packets between service nodes 14(1)-14(4).

Note that network infrastructure 20 can be differentiated from the rest of network 11 based on its location (e.g., relevance, significance, function, capacity, situation, position, etc.) in network traffic flow patterns: network infrastructure 20 is typically not an addressable end point in network 11; packets are delivered from and to end points, such as service nodes 14(1)-14(4) through (e.g., via, over, by way of, by, etc.) network infrastructure 20. Thus, whereas service nodes 14(1)-14(4) may be addressable, for example, by IP addresses, network infrastructure 20 may not be an endpoint of a packet's journey through network 11, and may not be addressable in that regard.

According to various embodiments, network infrastructure 20 can detect NAT transformations performed in service nodes 14(1)-14(4) based at least on a cookie 24 in a network service header (NSH) 30. As used herein, the term "cookie" comprises a string of numerals and/or letters indicating a specific flow in network 11. NSH 30 may comprise a service header on an overlay network inserted over and above each packet's network headers. Thus, NSH 30 is different from the packet's network headers, such as IP header, transport header, etc. In a general sense, NSH 30 comprises a data plane header added to frames/packets; NSH 30 includes information required for service chaining, and metadata added and consumed by network nodes (e.g., network infrastructure 20) and service nodes (e.g., 14(1)-14(4)). NSH 30 serves to create the service overlay (e.g., service plane) in network 11 for forwarding packets between service nodes 14(1)-14(4).

As used herein, "NAT" refers to any transformative service function that modifies (e.g., transforms, changes, rewrite, etc.) the packet's network header or values therein, wherein packets belonging to a specific flow characterized by a unique flow-tuple (e.g., source IP address, source port address, protocol, destination IP address, destination port address) in the packet's network header cannot be recognized as belonging to the specific flow after the transformative function is applied on the packet. Note that NAT does not change NSH 30.

For example, service function 16(7) may comprise a NAT function; network infrastructure 20 may detect NAT transformations performed at service function 16(7) in service node 14(2). The detection in network infrastructure 20 can serve to bypass service function 16(7) (and possibly service node 14(2)) while preserving the NAT transformation. Embodiments of communication system 10 facilitate offloading the NAT function on the packet of a specific flow to network infrastructure 20 without requiring any explicit message, pre-configuration, or other instruction specifying the NAT transformation.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Network services are widely deployed and essential in many networks. The services can provide a range of functions such as security, wide area network (WAN) acceleration, and server load balancing. Services that form part of an overall composite service may be physically located at different points in the network infrastructure, such as the wide area network, data center, enterprise, campus, etc. For some network services, traffic is forwarded through a sequence of nodes providing service functions. Forwarding traffic along a sequence of service functions is typically based on service characteristics. For example, certain traffic may be directed to a domain border gateway for monitoring and charging; certain other traffic may be steered through a load balancer to distribute performance pressure before forwarding to data center services; mobile network operators may split mobile broadband traffic and steer them along different offloading paths; firewalls may be used to filter traffic for Intrusion Detection System (IDS)/Intrusion Protection System (IPS); security gateways may be used to encrypt/decrypt traffic; certain traffic that traverses different network technology segments such as IPv4/IPv6 may be directed to a carrier grade network address translator (CGNAT); etc.

In some network architectures (e.g., Cisco™ Distributed Virtual Switch (DVS)), vPath™ integrates services with the network. vPath enables traffic redirection, service chaining and infrastructure programmability. Service chaining refers to a model for delivering multiple service functions in a specific order comprising the service chain. Service chaining de-couples service delivery from the underlying network infrastructure and creates a services plane that can address requirements of cloud and virtual application delivery. Packets and/or flows that require services to be applied are classified and redirected to the appropriate service functions. Additionally, context can be shared between the network infrastructure and the service nodes implementing the service functions. Service chain architecture further enables modularity of network operations; service functions can be split and chained together to compose complicated services.

vPath™ comprises a distributed service data path, a service traffic classifier, and service enforcement point. vPath intercepts traffic in the switch data plane in both directions (that is, both ingress and egress flows). vPath maintains four types of tables to classify and redirect traffic flows to enforce service policies: (1) service table: determines services to be delivered for the type of traffic; (2) service node table: defines service nodes activated in service path; (3) path table: orchestrates multiple service delivery in particular order for the same flow; (4) flow table: tracks the state of each flow. vPath is flow aware and programs flow entries in its flow table for all the intercepted flows, and redirects flows to service nodes defined in service path.

vPath uses a service overlay to steer traffic to the service nodes. A vPath 3.0 service header (e.g., NSH 30) is used as an encapsulation header to carry a forwarding state identification (e.g., service-path-identifier and a service-index). The service header can uniquely identify a particular service chain and location of the packet carrying the service header within the service chain at any given time. The service header can facilitate determining a next hop service function when used in conjunction with a service-forwarding table, which represents a forwarding state at the service nodes. In such network architectures, the classifier imposes the service header (e.g., NSH 30) on the selected flow and initializes the service path-identifier and the service-index in the service header. After each service delivery, the service index is decremented at the service node to indicate service delivery.

In some network architectures, the service chains are specified by a network operator in the service controller (e.g., 12) external to the service nodes. The service controller resolves service chain identifiers to corresponding forwarding states in the network identified by respective service-path-identifiers. The service controller distributes the forwarding states and the corresponding service-path-identifiers identifiers across the network infrastructure via proprietary control protocols or standard protocols like border gateway protocol (BGP). Network elements (such as the switches and routers) acting as the classifiers select and classify flows to be forwarded along various service chains. Note that the service chaining and other service overlay functions are performed on a per-flow basis; thus, each flow is typically subject to a specific service chain.

NAT is a commonly used service function in service nodes such as Server Load Balancers (SLB), firewalls, etc. NAT serves to conserve the IP addresses, maintain traffic affinity, and enforce security, among other uses. NAT may be used to map each address of one address space to a corresponding address in another space; NAT may also be used in conjunction with network masquerading (or IP masquerading) to hide an entire IP address space, usually consisting of (hidden) network IP addresses behind a single IP address in another, (usually public) address space. NAT function is typically performed using stateful translation tables to map the hidden addresses into a single IP address and to readdress the outgoing IP packets on exit so they appear to originate from a routing device at the network edge. In the reverse communications path, responses are mapped back to the originating IP addresses using rules (e.g., state) stored in the translation tables.

NAT poses many challenges to the service chaining architecture. For example, the network infrastructure cannot relate the service chain to the flow after the NAT transformation, because NAT changes the flow tuple, including the service characteristics. Therefore, the service chain has to be broken at the point of NAT, because service chains are configured according to flows, with each classified flow being processed according to a corresponding service chain. In other words, a new service chain has to be initiated after NAT is performed, from either within the service node or from the network infrastructure.

For example, consider service chain 18. The portion of service chain 18 up to and including service function 16(7), which comprises the NAT function, may be referred to as SC-1a. Packets of flow F1 serviced on service chain SC-1a may include a specific network header with a particular flow tuple (e.g., combination of header values such as source IP address, source port address, protocol, destination IP address, destination port address) that characterizes the packet as belonging to a specific flow. After service function 16(7) processes the packet belonging to the flow F1, the header values may change. Network infrastructure 20 can no longer recognize the packet as belonging to flow F1, because the network header, and thereby the flow tuple, has changed post NAT. Consequently, service chain SC-1a may be broken at service function 16(7) and a new service chain SC-1b may be created to continue processing the packets on the overlay network.

Further, NAT in a service node requires the flows to be always steered through the service node as the NAT function is based on a policy specific to the service node. The policy may specify the changes to be made to the network header as part of the NAT. In many cases, once the NAT policy is determined, the NAT transformation is unchanged for the life of the flow. In other words, there is no additional value delivered by the service node apart from applying the transformation; however, every packet of the flow must be steered to the service node, incurring additional costs.

Communication system 10 is configured to address these issues (among others) in offering a system and method for NAT offload to network infrastructure for service chains in a network environment. According to various embodiments, during configuration, service controller 12 may configure service chain 18 in network 11 for packets of a specific flow. During operation, network infrastructure 20 may receive a packet belonging to the specific flow. The specific flow may be identified by its unique flow tuple (e.g., source IP address, destination IP address, source port address, destination port address, protocol) determined from the packet's network header. If the specific flow has not been previously seen in network 11 (e.g., the packet is an initial packet of the flow), network infrastructure 20 may generate cookie 24 associating service chain 18 with the specific flow.

Network infrastructure 20 may insert the cookie in NSH 30 of the packet, and initialize an "offload bit" in NSH 30. The offload bit represents an instruction to offload the specific service function that was performed (if any) to network infrastructure 20. When initialized or reset, the offload bit indicates no offloading; when set, the offload bit indicates offloading. NSH 30 may also include a service function identifier, identifying the specific service function to be offloaded. Network infrastructure 20 may also initialize the service function identifier (SF ID) in NSH 30. The packet may be transmitted to the next service node 14(1) according to service chain 18.

The packet may continue in network 11 along various service nodes (e.g., service node 14(2)) until it reaches NAT function 16(7). NAT function 16(7) may perform NAT on the packet, and set the offload bit to indicate offloading to network infrastructure 20. During the NAT transformation, the unique flow tuple of the specific flow may be changed to a different flow tuple, for example, due to changes in the source IP address, destination IP address, etc.

When network infrastructure 20 receives the packet, network infrastructure 20 may identify the packet as belonging to the specific flow based on cookie 24 in NSH 30, even though the packet's transformed flow tuple indicates a different flow. In some embodiments, the identification may be based on the previously made association of cookie 24 with the specific flow and service chain 18. Moreover, comparison of the previous flow tuple (before NAT transformation) and the current flow tuple (after NAT transformation) may also indicate the flow tuple change made by NAT function 16(7). Thus, network infrastructure 20 may learn the NAT policy of service function 16(7). Based on the offload bit setting (indicating offload to network infrastructure 20), network infrastructure 20 may prepare to execute the NAT function on subsequent packets of the specific flow. Because the NAT function has already been performed on the packet, network infrastructure 20 may forward the packet to the next service node 14(3).

Figure 1B:
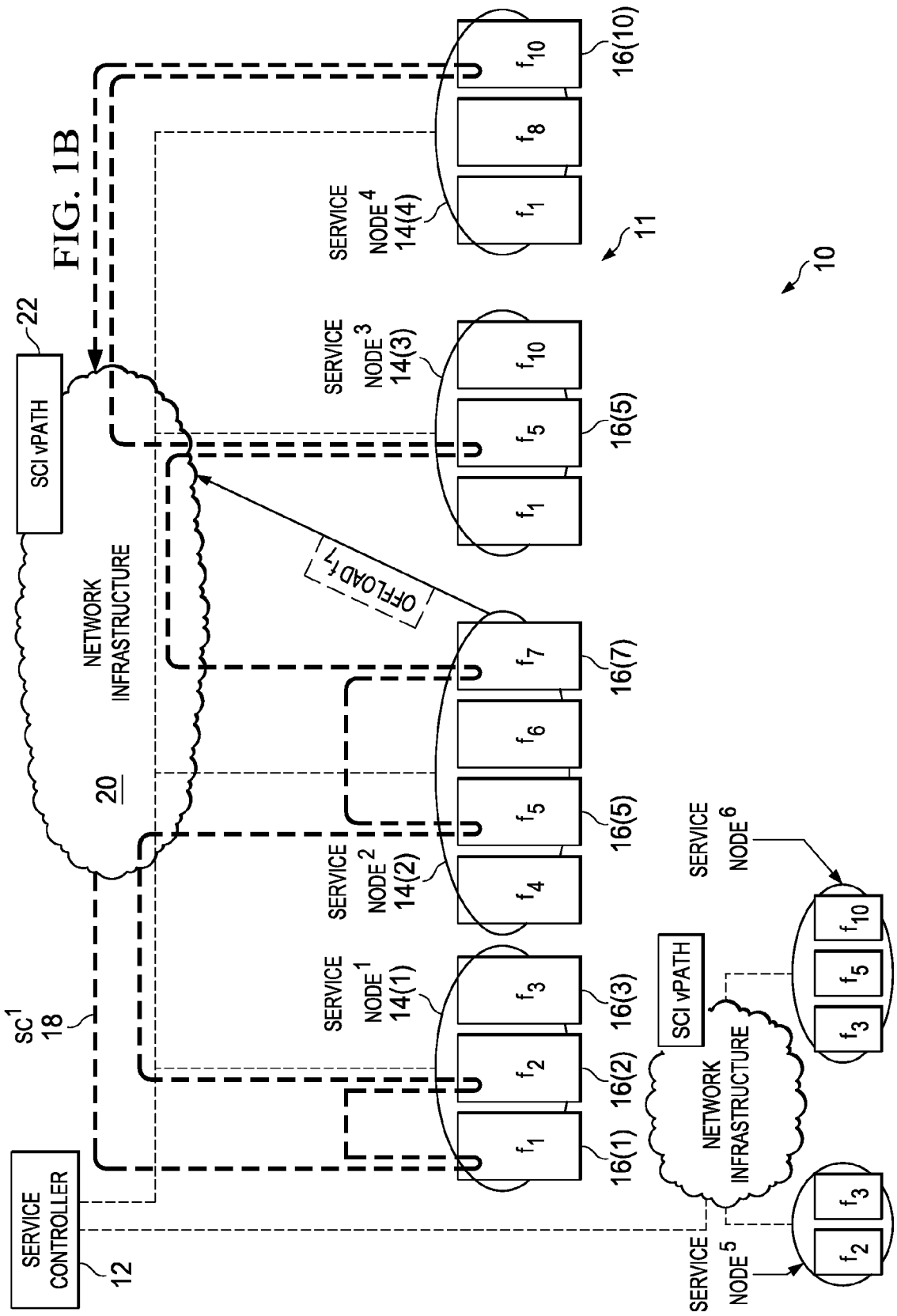
FIG. 1B is a simplified block diagram illustrating example details of an embodiment of the communication system.

Turning to FIG. 1B, when a subsequent packet in the specific flow arrives at network infrastructure 20, NAT service function 16(7) may be offloaded to network infrastructure 20 automatically. Network infrastructure 20 may execute the NAT transformation on the subsequent packet, the NAT transformation having been learnt from the previous packet, without further instruction from service controller 12, or any other intervention; and transmit the packet to next service node 14(3) instead of sending the packet to service node 14(2) for executing the NAT function.

Figure 1C:
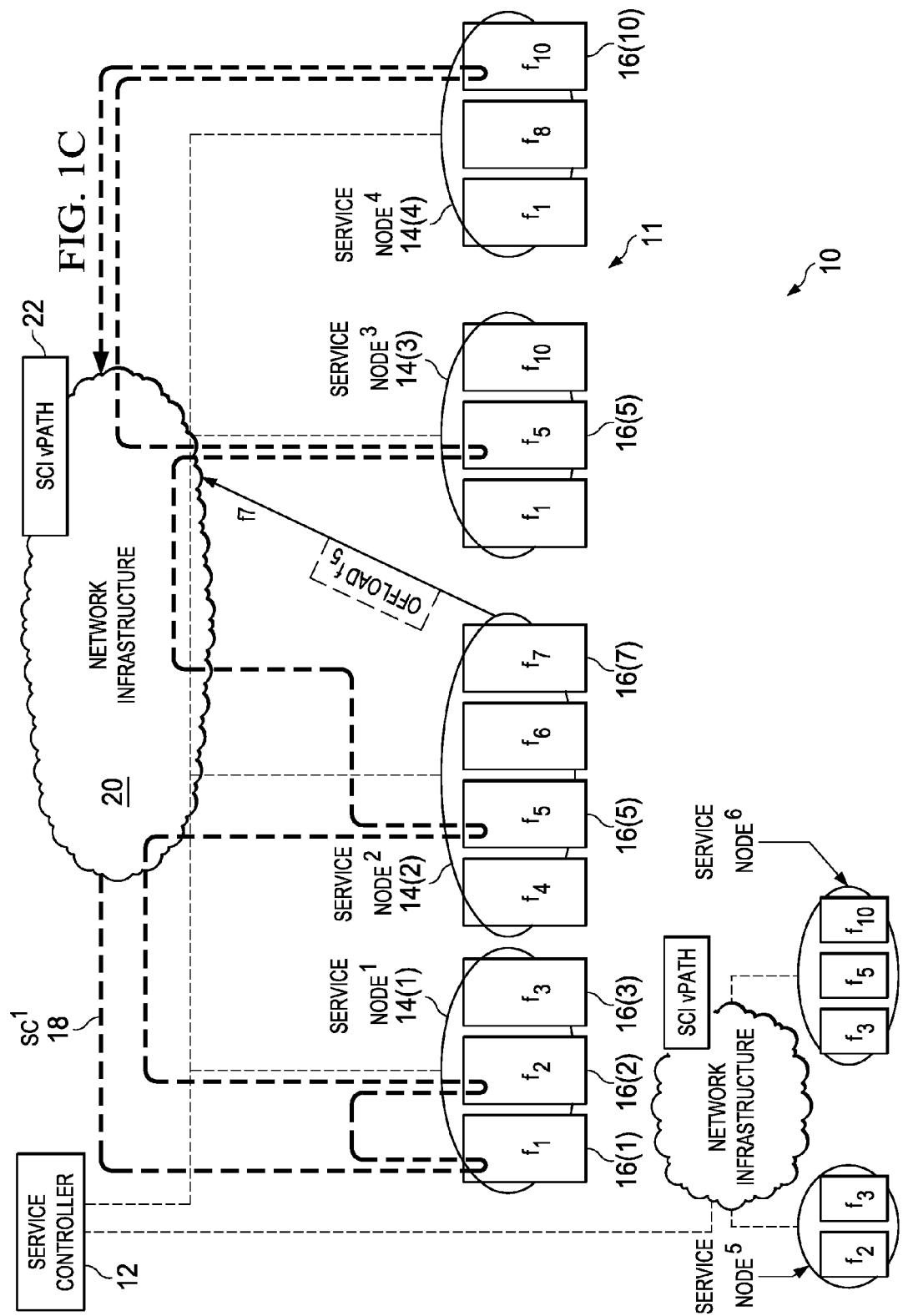
FIG. 1C is a simplified block diagram illustrating other example details of an embodiment of the communication system.
Figure 1D:
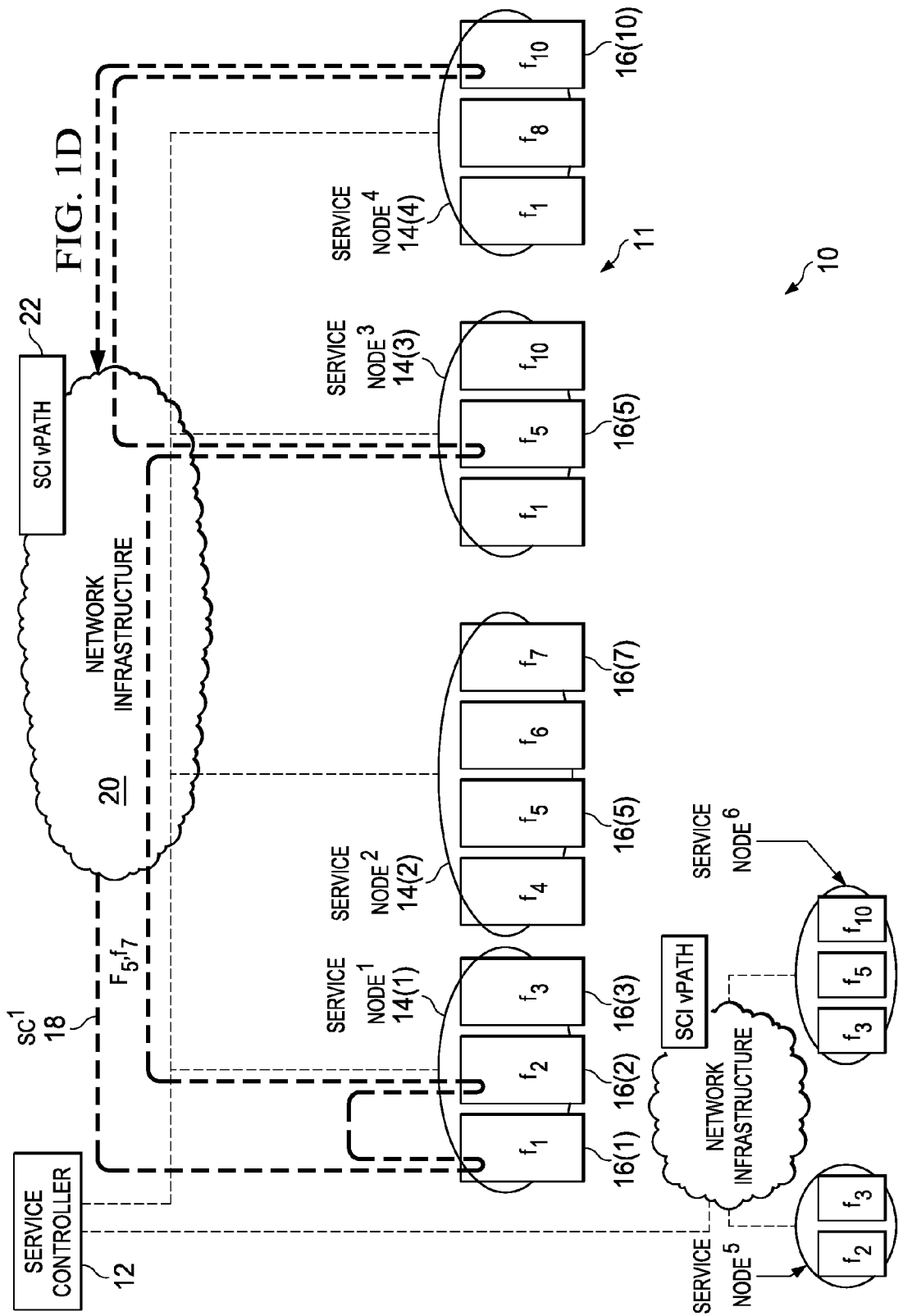
FIG. 1D is a simplified block diagram illustrating yet other example details of an embodiment of the communication system.

Turning to FIG. 1C, in some embodiments, substantially all service functions (e.g., 16(5), 16(7)) in service chain 18 performed for the specific flow by the service node (e.g., 14(2)) performing the NAT function may be offloaded to network infrastructure 20, if such capabilities exist in network infrastructure 20. For example, service function 16(5) may set an offload bit and a SF ID to indicate offloading to network infrastructure 20 for a first packet of the specific flow. Network infrastructure 20 may execute the offloaded functions for subsequent packets of the specific flow. Turning to FIG. 1D, thereafter, service node 14(2) may be bypassed completely for the specific flow without any intervention from service controller 12 or other network managing entity.

In another example embodiment, a sample service chain SC1 may be represented as SC1=S1:S2 (NAT):S3 where SC1 is a service chain with service nodes S1, S2, and S3. Service node S1 14(1) acts as a classifier that imposes the service chain SC1 on selected flows based on policies preconfigured at service node S1 14(1) by service controller 12. Service node S2 14(2) applies the NAT service function to the selected flows. Service nodes S1 14(1), S2 14(2), and S3 14(3) may be virtual or physical nodes in the virtual or physical access layer of network 11.

A top-of-rack (ToR) switch or a Distributed Virtual Switch (DVS) or any other network element of network infrastructure 20 that is part of the service chaining infrastructure may be responsible for forwarding packets to service nodes S1 14(1), S2 14(2) and S3 14(3) with NSHs added to the packets on a service overlay. In other words, the ToR/DVS are logically adjacent to service nodes S1 14(1), S2 14(2), and S3 14(3). The ToR/DVS participating in the service chaining may insert cookie 24 into NSH 30 prior to steering the flows to service nodes S1 14(1), S2 14(2), and S3 14(3). Substantially simultaneously, ToR/DVS may maintain a flow state that includes the flow specification (e.g., 5-tuple) and service chain information. Cookie 24 inserted into NSH 30 can identify the flow in the ToR/DVS. Thus, when the packet that is treated with NAT by service node S2 14(2) is received back at the ToR/DVS, cookie 24 (unchanged by service node S2) can identify the flow-state prior to the NAT transformation. The flow specification or the packet header post servicing reveals the transformation of the packet with respect to the prior flow state. Cookie 24 thus ties the flow states before and after NAT execution. The ToR/DVS can confirm that NAT has indeed occurred inspecting the packet transformation and cookie 24.

According to various embodiments, service nodes 14(1)-14(4) can use bits in NSH 30 to signal the flow to be offloaded to network infrastructure 20. After a service node (e.g., 14(2)) treats the incoming packet with NAT and any additional service functions, it can set one or more offload bits in NSH 30 to request network infrastructure 20 to not steer packets of the flow to service node 14(2). Network infrastructure 20, having detected the NAT transformation on the packets of the flow, can bypass service node 14(2) for subsequent packets of the flow and perform the NAT transformation locally in network infrastructure 20, thereby potentially avoiding additional latencies incurred in steering the flows to service node 14(2) for NAT and compute resource consumption.

Embodiments of communication system 10 can enable within network infrastructure 20, automatic detection of NAT transformations performed in service nodes 14(1)-14(4). NAT offload to network infrastructure 20 may be facilitated without the explicit specification of the NAT transformation. Service chains (e.g., 18) can extend or span across NAT service functions without breaking into portions before and after NAT transformation, (e.g., SC-1a and SC-1b). Offloading to network infrastructure 20 can potentially remove transit latencies involved in the steering the flows to service nodes (e.g., 14(2)) to perform NAT. Further benefits can be achieved from the optimized implementation of NAT, including in hardware, to achieve enhanced network performance (e.g., ToR/DVS performance).

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network. The example network environment of home network 17 may be configured over a physical infrastructure that may include WLANs (including Bluetooth), and wired LANs.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, service controller 12, service nodes 14(1)-14(4), and service functions 16(1)-16(10) may be implemented as applications executing in separate standalone network elements, or as a combination in one or more network elements (e.g., service controller 12 executing in one network element, and service nodes 14(1)-14(4) (and associated service functions) executing in a separate network element; and other such combinations). Service controller 12 may comprise a management plane responsible for orchestration, management, and control of virtual network services in network 11. For example, service nodes 14(1)-14(N) can comprise physical service appliances (e.g., stand-alone boxes) plugged into network 11 appropriately. In another example, service nodes 14(1)-14(4) can comprise service cards attached internally within another network element, such as a router or switch in network 11. In yet another example, service nodes 14(1)-14(4) can comprise applications executing on one or more servers in network 11. In some embodiments, service nodes 14(1)-14(4) can comprise a combination of the above. Further, they may be implemented as software modules running in a data center, in clouds or as standalone physical equipment.

Note that when service functions 16(1)-16(10) are offloaded to network infrastructure 20, they no longer require separate addressing. For example, a switch comprising network infrastructure 20 may perform firewall services within the switch without requiring separate addressing for the firewall services. In contrast, when the switch is configured with a line card having a separate address that performs firewall services, the line card may comprise a service node separate from the switch-network infrastructure.

In various embodiments, service functions 16(1)-16(10), service controller 12, and service nodes 14(1)-14(4) may be connected in network 11 over a distributed virtual switch, which can include physical and virtual switches and any suitable network element capable of receiving and forwarding packets appropriately in a network environment. Any number of service functions and service nodes may be active within network 11 within the broad scope of the embodiments.

In various embodiments, network infrastructure 20 can comprise one or more network elements that in combination perform the operations described herein. For example, the cookie association with the flow when the flow is first seen in network 11 can be performed at one ToR, and advertised in network 11 to other ToRs in network 11. Substantially all ToRs may store the cookie association with the flow locally. Subsequently, packets reaching any of the other ToRs after NAT transformation may be recognized based on the stored association. The offloaded NAT function may be executed by yet another ToR, and so on. In other embodiments, substantially all operations of network infrastructure 20 may be performed by a single network element. For example, substantially all packets of the flow from ingress into network 11 to egress out of network 11 may be handled by a single ToR, which stores the cookie-flow association and executes the offloaded NAT function.

In various embodiments, network infrastructure 20 may include a DVS with SCI-vPath 22 embedded therein. vPath architecture supports virtualized network services with intelligent traffic steering and performance acceleration. In some embodiments, vPath may provide embedded intelligence within Cisco Nexus 1000V Series Virtual Ethernet Modules (VEMs) to dynamically apply multiple services to virtual machine (VM) traffic. vPath communicates with service nodes 14(1)-14(4) over tunnels, decoupling service nodes 14(1)-14(4) from network infrastructure 20. The Cisco vPath architecture provides a forwarding-plane abstraction and a programmable framework for inserting or removing service functions 16(1)-16(10) at a hypervisor layer.

Figure 2:
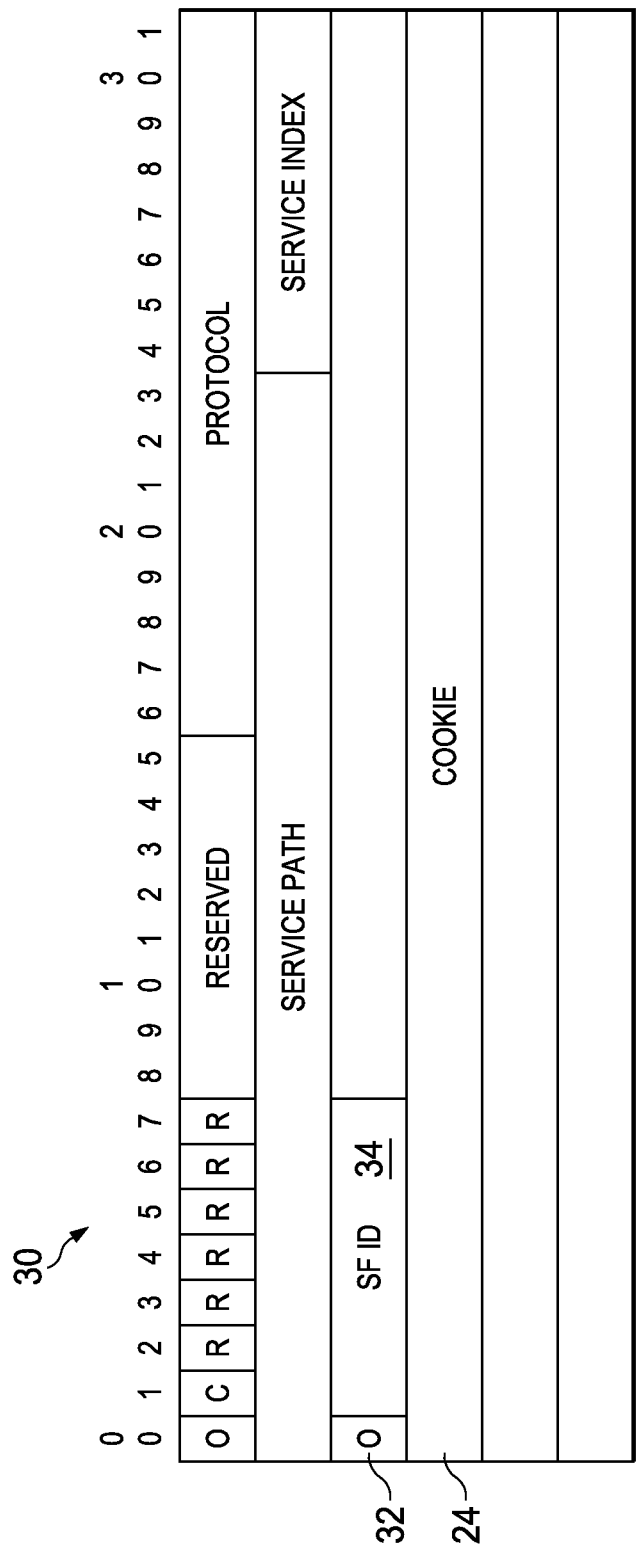
FIG. 2 is a simplified block diagram illustrating yet other example details of embodiments of the communication system.

Turning to FIG. 2, FIG. 2 is a simplified block diagram illustrating example details of another embodiment of communication system 10. Example NSH 30 may include cookie 24, an offload bit 32, and a service identifier (SF ID) 34 identifying the specific service to be offloaded (or not) according to offload bit 32. Each service function may rewrite NSH 30 with its own SF ID and network infrastructure 20 may track the various service functions that request offloading. NSH 30 may include a plurality of SF IDs associated with a corresponding plurality of service functions to indicate simultaneous offload of the plurality of service functions. Note that the particular example NSH 30 provided herein is merely for example purposes; any suitable format may be used for NSH 30 within the broad scope of the embodiments.

Figure 3:
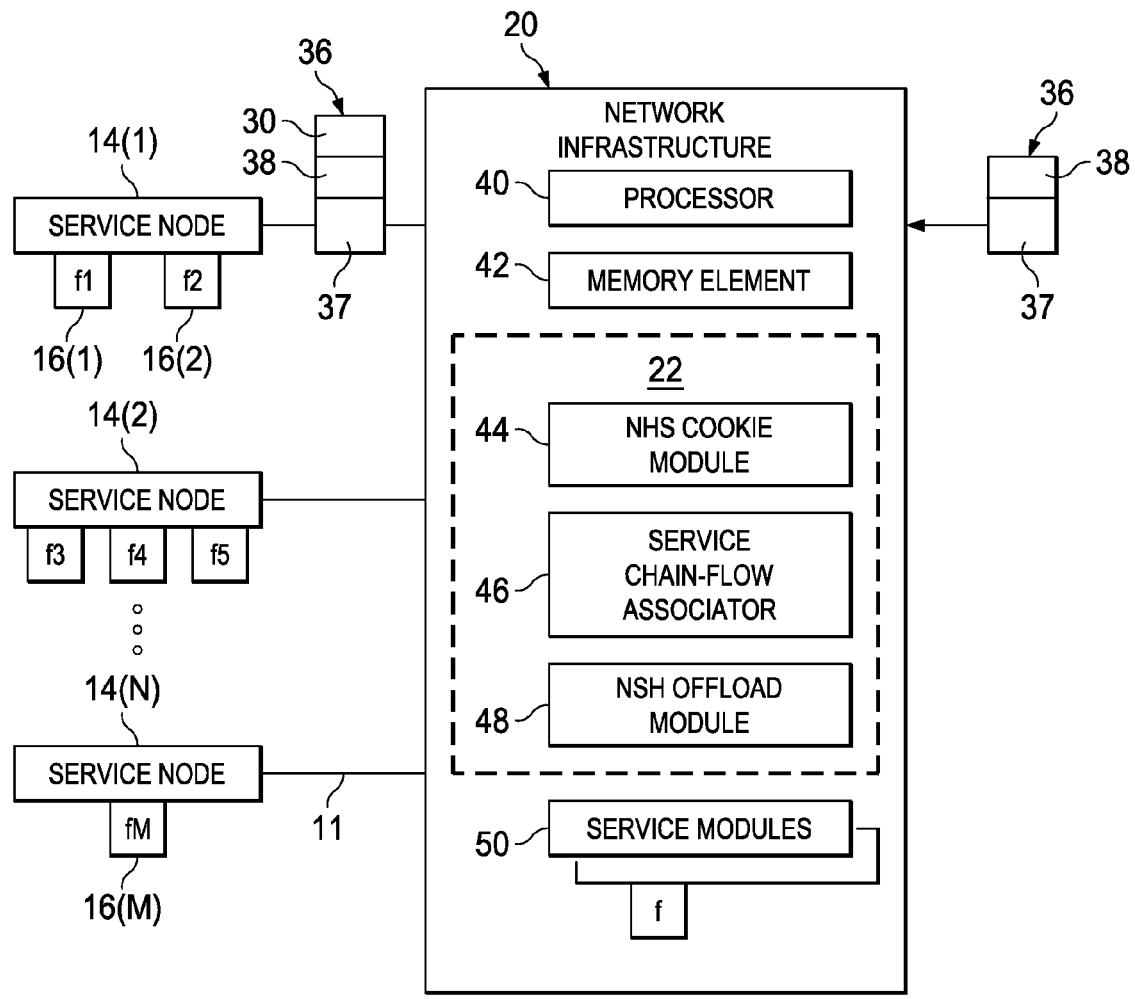
FIG. 3 is a simplified block diagram illustrating yet other example details of embodiments of the communication system.

Turning to FIG. 3, FIG. 3 is a simplified block diagram illustrating example details of another embodiment of communication system 10. A plurality of service nodes 14(1)-14(N) may be connected to example network infrastructure 20 over network 11, where N is any integer greater than or equal to 1. Each service node 14(1)-14(N) may be identified and addressed by a unique address (e.g., IP address) within network 11. Each service node 14(1)-14(N) may execute one or more service functions 16(1)-16(M), where M is any integer greater than or equal to 1. For example, service node 14(1) may execute service functions 16(1) and 16(2); service node 14(N) may execute service function 16(M); and so on. Assume, merely for example purposes that service function 16(1) comprises NAT.

Example network infrastructure 20 may receive packets (e.g., packet 36) from service nodes 14(1)-14(N) in network 11. Example packet 36 may include a payload 37, a network header 38, and NSH 30. Network infrastructure 20 may include a processor 40, a memory element 42, a NSH cookie module 44, a service chain-flow associator 46, a NSH offload module 48, and one or more service modules 50. In particular, at least one of service module 50 may include capability to perform NAT. In certain embodiments, network infrastructure 20 includes a DVS, SCI-vPath 22 may incorporate NSH cookie module 44, service chain-flow associator 46, and NSH offload module 48.

During operation, network infrastructure 20 may receive packet 36 (e.g., from outside network 11). Network infrastructure 20 may determine that packet 36 has not been previously seen. Network infrastructure 20 may generate NSH 30; NSH module 44 may generate cookie 24 associated with the flow of packet 36 and insert cookie 24 into NSH 30; and service chain-flow associator 46 may associate cookie 24 with the service chain and flow of packet 36 (e.g., generate a table associating cookie with the 5 tuple of the flow obtained from network header 38). Network infrastructure 20 may determine (e.g., based on flow table, service chain configuration, and other criteria) that packet 36 is to be forwarded to service node 14(1) for performing service functions 16(1) and 16(2). Network infrastructure 20 may insert NSH 30 (comprising cookie 24) in packet 36, and forward packet 36 to service node 14(1). Network infrastructure 20 may store a flow state (e.g., flow tuple) identifying the flow.

Service function 16(1) may execute the NAT transformation on packet 36 and transform network header 38 according to pre-configured NAT policies on service node 14(1). Service function 16(1) may also set the offload bit in NSH 30 and insert the appropriate service identifier therein to offload service function 16(1) to network infrastructure 20 for subsequent packets of the flow. Service function 16(2) may subsequently perform another service on packet 36 and send packet 36 back to network infrastructure 20. Service chain-flow associator 46 may inspect cookie 24 in NSH 30, and determine, based on cookie 24, that packet 36 is associated with a previously seen flow and service chain, even though the flow tuple of the received packet indicates a different flow (e.g., due to NAT transformation). NSH offload module 48 may inspect offload bit 32 and SF ID 34 in NSH 30 and determine that service function 16(1) has requested offload of its services to network infrastructure 20 for subsequent packets of the flow. NSH offload module 48 may compare network header 38 before NAT transformation (e.g., based on information stored from a previous encounter with packet 36) and after NAT transformation, and identify the specific transformative policies. NSH offload module 48 may offload the NAT execution to service module 50 within network infrastructure 20. Service module 50 may mark the flow to execute the NAT (e.g., f1) on subsequent packets of the flow (e.g., by storing flow state in service module 50), and forward packet 36 to the next service node on the appropriate service chain.

Figure 4:
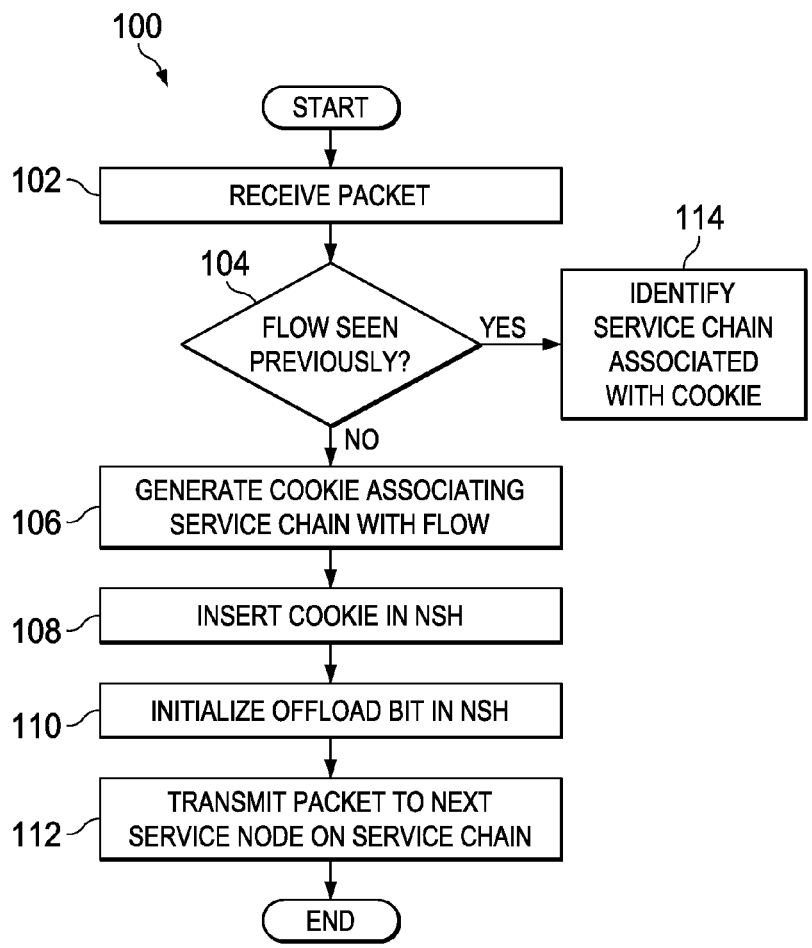
FIG. 4 is a simplified flow diagram illustrating example operations that may be associated with an embodiment of the communication system.

Turning to FIG. 4, FIG. 4 is a simplified flow diagram illustrating example operations 100 that may be associated with embodiments of communication system 10. At 102, network infrastructure 20 may receive packet 36. At 104, a determination may be made at network infrastructure 20 whether the flow associated with packet 26 has been seen previously. The determination may be based on the presence or absence of cookie 24, NSH 30 in packet 36, or flow state stored in service module 50 of network infrastructure 20. Thus if cookie 24 is absent, the flow may be determined to be a first encounter. If the flow has not been seen previously, at 106, network infrastructure 20 may generate cookie 24 associating service chain with the flow of packet 36. At 108, network infrastructure 20 may insert cookie 24 into NSH 30 of packet 36. At 110, offload bit 32 in NSH 30 may be initialized. At 112, packet 36 may be transmitted to the next service node on the service chain. Turning back to 104, if the flow has been seen previously, at 114, network infrastructure may identify the service chain associated with cookie 24 in NSH 30.

Figure 5:
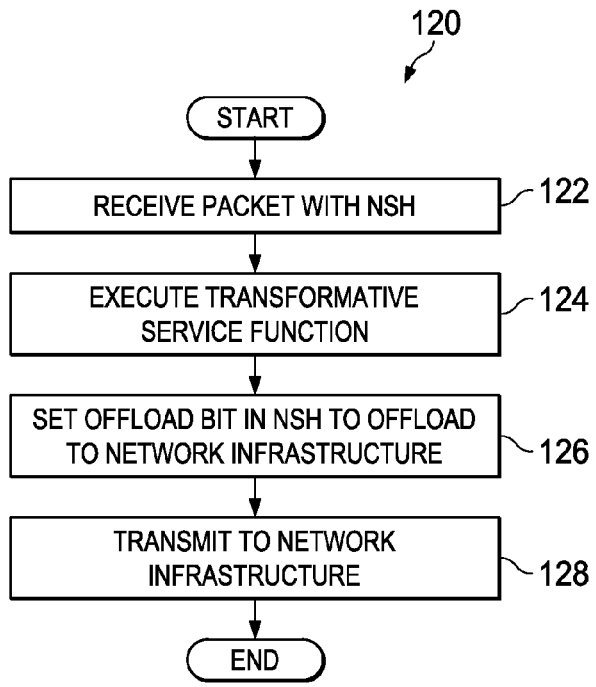
FIG. 5 is a simplified flow diagram illustrating other example operations that may be associated with an embodiment of the communication system.

Turning to FIG. 5, FIG. 5 is a simplified flow diagram illustrating example operations 120 that may be associated with embodiments of communication system 10. At 122, example service node 16(1) may receive packet 36 with NSH 30. At 124, service node 14(1) may execute NAT service function 16(1) on packet 36. At 126, service node 14(1) may sent offload bit 32 in NSH 30 to offload NAT function to network infrastructure 20. At 128, service node 14(1) may transmit packet 36 to network infrastructure 20.

Figure 6:
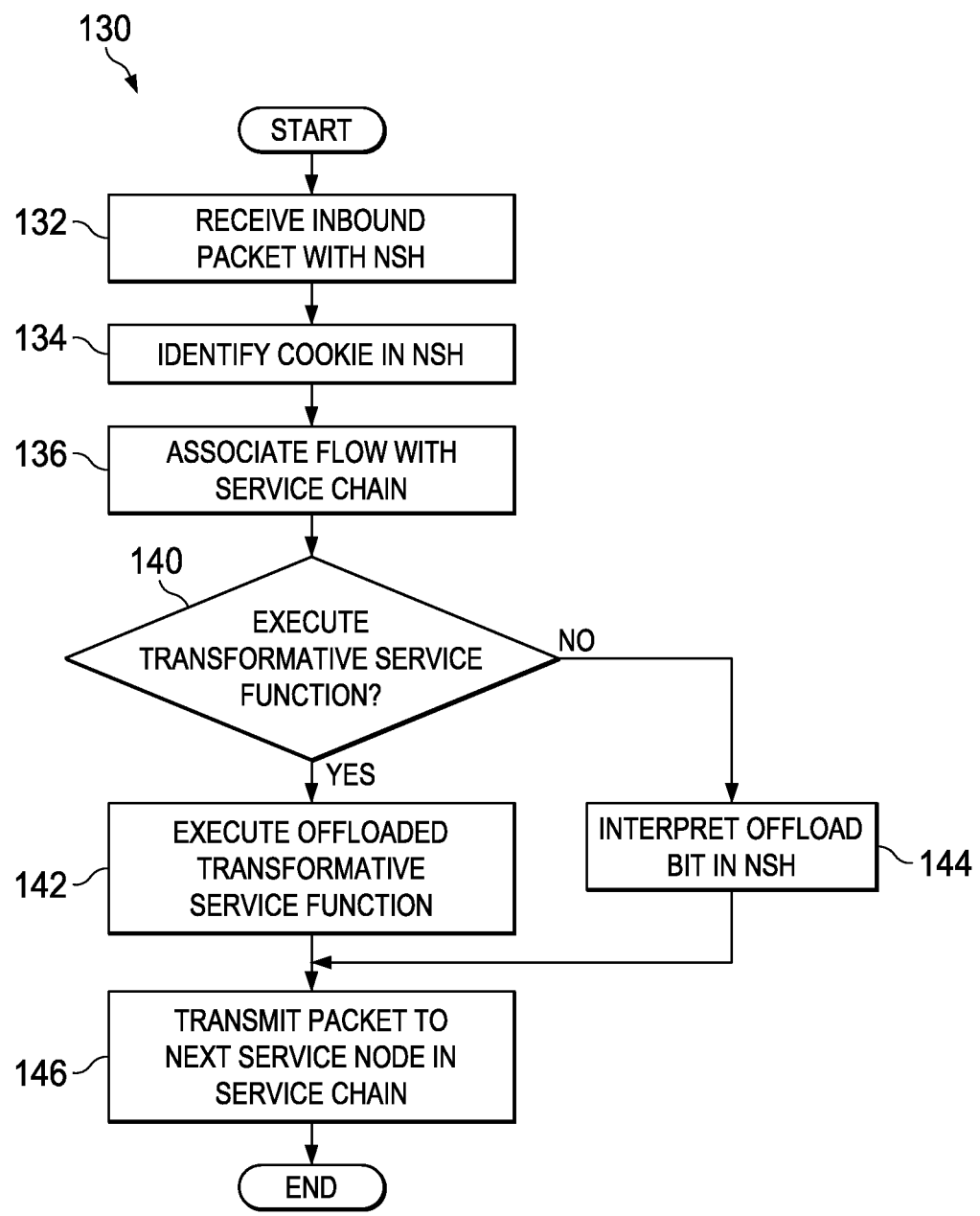
FIG. 6 is a simplified flow diagram illustrating yet other example operations that may be associated with an embodiment of the communication system.

Turning to FIG. 6, FIG. 6 is a simplified flow diagram illustrating example operations 130 that may be associated with embodiments of communication system 10. At 132, network infrastructure 20 may receive inbound packet 36 with NSH 30. At 134, network infrastructure 20 may identify cookie 24 in NSH 30. At 136, network infrastructure 20 may associate the flow with the service chain, for example, based on association from previous encounter with packet 36. At 140, a determination may be made whether to execute the NAT. For example, NAT may be executed at network infrastructure 20 if the flow has been previously marked for offloading based on the value of offload bit 32 of a previously encountered packet. If the flow is marked for offloading, at 142, network infrastructure 20 may execute the offloaded transformative service function. Otherwise, if the flow is not so marked (e.g., NAT has already been performed; packet 36 is a returning packet, not subject to NAT; offload bit 32 is not set previously; etc.), at 144, offload bit 32 may be interpreted. If the value of offload bit 32 indicates offloading to network infrastructure 20, the flow may be marked for offloading for subsequent packets of the flow. At 146, packet 36 may be transmitted to the next service node in the service chain.

Figure 7:
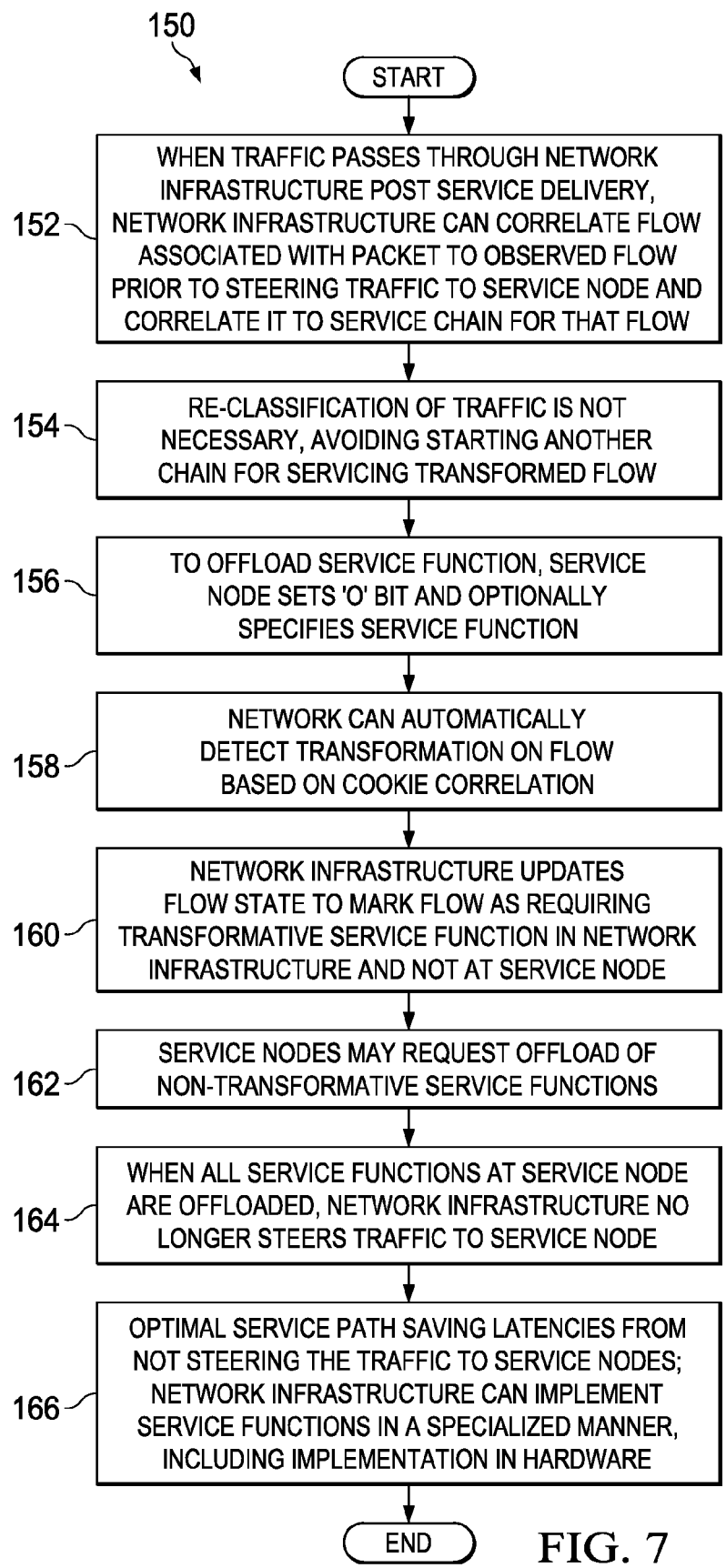
FIG. 7 is a simplified flow diagram illustrating yet other example operations that may be associated with an embodiment of the communication system.

Turning to FIG. 7, FIG. 7 is a simplified flow diagram illustrating example operations 150 that may be associated with embodiments of communication system 10. At 152, when traffic (e.g., flows) passes through network infrastructure 20 post service delivery, network infrastructure 20 can correlate the flow associated with packet 36 to the observed flow prior to steering traffic to the service node (e.g., 14(1)) and correlate it to the service chain (e.g., 18) for that flow. At 154, re-classification of traffic may not be necessary, avoiding starting another chain for servicing transformed flow. At 156, to offload the service function (e.g., 16(1)), the service node (e.g., 14(1)) sets 'O' bit, namely offload bit 32 and optionally specifies the service function (e.g., with SF ID 34).

At 158, network infrastructure 20 can automatically detect transformation on flow based on cookie correlation. At 160, network infrastructure 20 updates flow state to mark flow as requiring transformative service function in network infrastructure 20 and not at service node (e.g., 14(1)). At 162, service nodes 14(1)-14(n) may request offload of non-transformative service functions as well. At 164, when substantially all service functions (e.g., 16(1), 16(2)) at service node (e.g., 14(1)) are offloaded, network infrastructure 20 may no longer steer traffic to service node (e.g., 14(1)). At 166, optimal service path saving latencies from not steering the traffic to service nodes may be achieved; network infrastructure 20 can implement service functions in a specialized manner, including implementation in hardware.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, network infrastructure 20, and service nodes 14(1)-14(N). In some embodiments, one or more of these features may be implemented in hardware, provided external to these elements, or consolidated in any appropriate manner to achieve the intended functionality. The various network elements (e.g., network infrastructure 20 and service nodes 14(1)-14(N)) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, network infrastructure 20 and service nodes 14(1)-14(N) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 42) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 40) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a packet at a network infrastructure in a network comprising a plurality of service nodes interconnected through the network infrastructure, wherein each service node executes at least one service function;
   identifying the packet as belonging to a first flow based on a cookie in a network service header (NSH) of the packet, wherein the NSH further indicates a service chain comprising a sequence of service functions to be executed on the packet at the service nodes, wherein a flow tuple of the packet indicates a different second flow, wherein at least one service function in the service chain comprises network address translation (NAT) that changes a first flow tuple identifying the first flow to a second flow tuple identifying the second flow;
   determining that a service function in the service chain is to be offloaded from one of the service nodes to the network infrastructure for subsequent packets of the first flow, wherein the offloaded service function comprises the NAT; and
   executing the offloaded service function at the network infrastructure for subsequent packets of the first flow.

2. The method of claim 1, wherein the first flow is identified by a first flow tuple and the second flow is identified by a different second flow tuple, wherein the flow tuple of the packet received at the network infrastructure comprises the second flow tuple.

3. The method of claim 1, further comprising:
   receiving an initial packet of the first flow;
   generating the cookie associating the first flow with the service chain; and
   inserting the cookie in the NSH of the packet and the subsequent packets of the first flow.

4. The method of claim 1, wherein the network infrastructure determines a NAT policy for executing the offloaded NAT by comparing the first flow tuple and the second flow tuple.

5. The method of claim 1, wherein the determining that one of the service functions in the service chain is to be offloaded is based on inspecting a value of an offload bit in the NSH.

6. The method of claim 1, wherein the service function to be offloaded is identified by a service function identifier in the NSH.

7. The method of claim 1, wherein Begin service functions performed at one of the service nodes are offloaded to the network infrastructure, wherein the service node is bypassed for the subsequent packets of the first flow.

8. The method of claim 1, wherein the service chain is assigned to the first flow by a service controller in the network.

9. Non-transitory tangible media that includes instructions for execution, which when executed by a processor, is operable to perform operations comprising:
   receiving a packet at a network infrastructure in a network comprising a plurality of service nodes interconnected through the network infrastructure, wherein each service node executes at least one service function;
   identifying the packet as belonging to a first flow based on a cookie in a NSH of the packet, wherein the NSH further indicates a service chain comprising a sequence of service functions to be executed on the packet at the service nodes, wherein a flow tuple of the packet indicates a different second flow, wherein at least one service function in the service chain comprises NAT that changes a first flow tuple identifying the first flow to a second flow tuple identifying the second flow;
   determining that a service function in the service chain is to be offloaded from one of the service nodes to the network infrastructure for subsequent packets of the first flow, wherein the offloaded service function comprises the NAT; and
   executing the offloaded service function at the network infrastructure for subsequent packets of the first flow.

10. The media of claim 9, wherein the operations further comprise:
    receiving an initial packet of the first flow;
    generating the cookie associating the first flow with the service chain; and
    inserting the cookie in the NSH of the packet and the subsequent packets of the first flow.

11. The media of claim 9, wherein the network infrastructure determines a NAT policy for executing the offloaded NAT by comparing the first flow tuple and the second flow tuple.

12. The media of claim 9, wherein the first flow is identified by a first flow tuple and the second flow is identified by a different second flow tuple, wherein the flow tuple of the packet received at the network infrastructure comprises the second flow tuple.

13. The media of claim 9, wherein the service function to be offloaded is identified by a service function identifier in the NSH.

14. The media of claim 9, wherein the service chain is assigned to the first flow by a service controller in the network.

15. An apparatus, comprising:
    a memory element for storing data; and
    a processor, wherein the processor executes instructions associated with the data, wherein the processor and the memory element cooperate, such that the apparatus is configured for:
        receiving a packet at a network infrastructure in a network comprising a plurality of service nodes interconnected through the network infrastructure, wherein each service node executes at least one service function;
        identifying the packet as belonging to a first flow based on a cookie in a NSH of the packet, wherein the NSH further indicates a service chain comprising a sequence of service functions to be executed on the packet at the service nodes, wherein a flow tuple of the packet indicates a different second flow, wherein at least one service function in the service chain comprises network address translation (NAT) that changes a first flow tuple identifying the first flow to a second flow tuple identifying the second flow;

determining that a service function in the service chain is to be offloaded from one of the service nodes to the network infrastructure for subsequent packets of the first flow, wherein the offloaded service function comprises the NAT; and executing the offloaded service function at the network infrastructure for subsequent packets of the first flow.

16. The apparatus of claim 15, wherein the operations further comprise:

receiving an initial packet of the first flow;

generating the cookie associating the first flow with the service chain; and inserting the cookie in the NSH of the packet and the subsequent packets of the first flow.

17. The apparatus of claim 15, wherein the network infrastructure determines a NAT policy for executing the offloaded NAT by comparing the first flow tuple and the second flow tuple.

18. The apparatus of claim 15, wherein the first flow is identified by a first flow tuple and the second flow is identified by a different second flow tuple, wherein the flow tuple of the packet received at the network infrastructure comprises the second flow tuple.

19. The apparatus of claim 15, wherein the service function to be offloaded is identified by a service function identifier in the NSH.

20. The apparatus of claim 15, wherein the service chain is assigned to the first flow by a service controller in the network.

* * * * *